United States Patent
Baccouche et al.

(10) Patent No.: US 9,636,984 B1
(45) Date of Patent: May 2, 2017

(54) INTEGRATED EXTRUDED BATTERY ENCLOSURE ATTACHMENT

(71) Applicant: Ford Global Technologies, LLC, Dearborn, MI (US)

(72) Inventors: Mohamed Ridha Baccouche, Ann Arbor, MI (US); James Chih Cheng, Troy, MI (US); Rahul Arora, Royal Oak, MI (US); Eid Farha, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/944,391

(22) Filed: Nov. 18, 2015

(51) Int. Cl.
*B60R 16/04* (2006.01)
*B60K 1/04* (2006.01)

(52) U.S. Cl.
CPC ............. *B60K 1/04* (2013.01); *B60R 16/04* (2013.01); *B60K 2001/0438* (2013.01)

(58) Field of Classification Search
CPC ......... B60R 160/04; Y02E 60/12; B60K 1/04; B60K 2001/0438
See application file for complete search history.

(56) References Cited

U.S. PATENT DOCUMENTS

| 7,216,924 | B2* | 5/2007 | Li | B62D 25/025 296/187.12 |
| 7,398,849 | B2* | 7/2008 | Yoshida | B60K 1/04 180/68.5 |
| 8,646,830 | B2 | 2/2014 | Hettinger et al. | |
| 8,974,943 | B2* | 3/2015 | Feng | H01M 10/5004 429/120 |
| 2012/0115001 | A1* | 5/2012 | Hatta | B60K 1/04 429/100 |

FOREIGN PATENT DOCUMENTS

| DE | 102013102501 A1 | 9/2014 |
| DE | 102013008428 A1 | 12/2014 |
| EP | 2555277 B1 | 2/2013 |

* cited by examiner

*Primary Examiner* — John Walters
*Assistant Examiner* — James Triggs
(74) *Attorney, Agent, or Firm* — Jason C. Rogers; Brooks Kushman P.C.

(57) ABSTRACT

A vehicle includes a floor and an aluminum battery enclosure. The enclosure has L-shaped formed side walls each at least partially defining a traction battery cavity and including a foot attached to the floor. Each of the feet extends an entire length of the corresponding side wall to distribute impact energy along the entire length to maintain a relative position between the floor and enclosure.

12 Claims, 4 Drawing Sheets

INTEGRATED EXTRUDED BATTERY ENCLOSURE ATTACHMENT

TECHNICAL FIELD

The present disclosure relates to battery enclosures for electric vehicles.

BACKGROUND

Battery enclosures for hybrid electric vehicles can be attached to a floor of a vehicle using a plurality of steel brackets. Typically, steel brackets are distributed around the enclosure and attach the enclosure to the floor of the vehicle. In the event of impact, the steel brackets bring a concentrated point load to the battery enclosure. Also, the steel brackets can be welded to an aluminum battery enclosure. To prevent a galvanic reaction between the enclosure and the brackets, the brackets are surface treated to prevent the steel surface of the bracket from contacting the aluminum surface of the enclosure.

SUMMARY

A vehicle includes a floor and an aluminum battery enclosure formed to have L-shaped side walls each at least partially defining a traction battery cavity and a foot attached to the floor. Each of the feet extends a length of the corresponding side wall to distribute impact energy along the length to maintain a relative position between the floor and enclosure.

An enclosure for a battery of a hybrid electric vehicle includes a battery cell array, an aluminum frame having side walls surrounding the battery cell array, and an aluminum bracket. The aluminum bracket includes a flange mated with the frame and extending across an entire length of one of the side walls, and a foot mated with a floor of the vehicle and extending away from the one of the side walls.

A vehicle body in white structure includes a floor, an aluminum battery enclosure having a frame surrounding a battery array, and an aluminum bracket. The bracket defines a flange integrally formed with and extending across an entire length of the frame, and a foot attached to the floor and extending across the entire length of the frame perpendicular to the flange.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
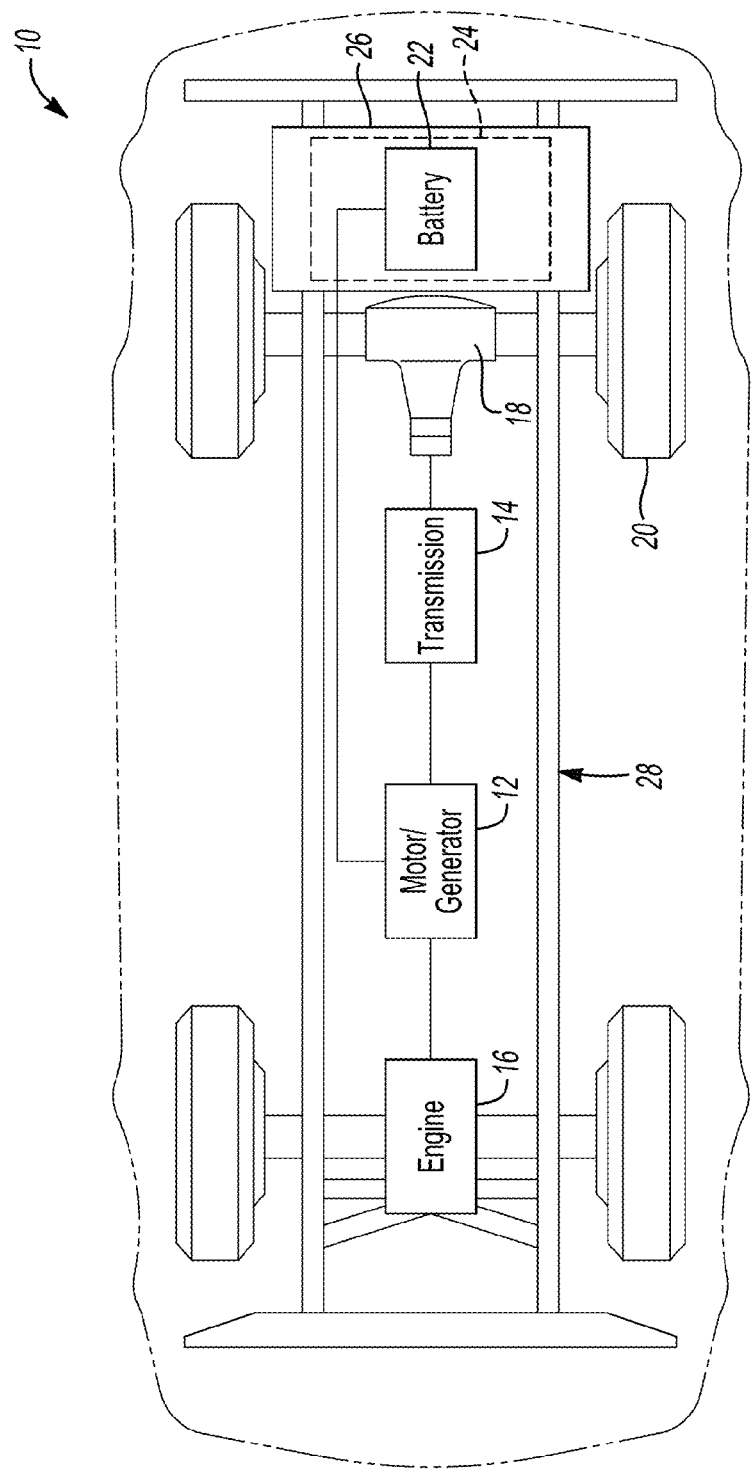
FIG. 1 is a diagrammatic view of a vehicle.

FIG. 1 depicts a schematic of a typical hybrid-electric vehicle 10. Certain embodiments, however, may also be implemented within the context of plug-in hybrids and fully electric vehicles. The vehicle 10 includes one or more electric machines 12 mechanically connected to a hybrid transmission 14. In at least one embodiment, a single electric machine 12 may be mechanically connected to the hybrid transmission 14. The electric machine 12 may be capable of operating as a motor or a generator. In addition, the hybrid transmission 14 may be mechanically connected to an engine 16. The hybrid transmission 14 may also be mechanically connected to a drive shaft 18 that is mechanically connected to the wheels 20. The electric machine 12 can provide propulsion through the drive shaft 18 to the wheels 20 and deceleration capability when the engine 16 is turned on or off. The electric machine 12 also acts as a generator and can provide fuel economy benefits by recovering energy through regenerative braking. The electric machine 12 reduces pollutant emissions and increases fuel economy by reducing the work load of the engine 16.

A traction battery or battery pack 22 stores energy that can be used by the electric machine 12. The traction battery 22 typically provides a high voltage direct current (DC) output from one or more battery cell arrays, sometimes referred to as battery cell stacks, within the traction battery 22. The battery cell arrays may include one or more battery cells. The traction battery 22 may be supported by an enclosure 24 on a tray structure 26 of the vehicle 10. The tray structure 26 is bolted to a body in white structure 28 of the vehicle 10.

The tray structure 26 may be configured to provide stiffness and durability to the traction battery 22 during normal vehicle operation. For example, during normal vehicle operation, noise, vibration, and harshness may be transmitted through the enclosure 24 and tray structure 26 to the traction battery 22. Maintaining integrity of the traction battery 22 allows the electric machine 12 to propel the vehicle 10 over a longer period of travel. This reduces the fuel consumption by the engine 16. Further, in the event of a load applied to the enclosure 24, for example a rear impact, energy may be transferred through the enclosure 24 and tray structure 26 to the traction battery 22. The tray structure 26 may need to be designed such that the enclosure 24 maintains durability and stiffness to compensate for noise, vibration, and harshness as well as to absorb energy when a load is applied to the tray structure 26 to further reduce intrusion into a cabin (not shown) of the vehicle 10.

Figure 2:
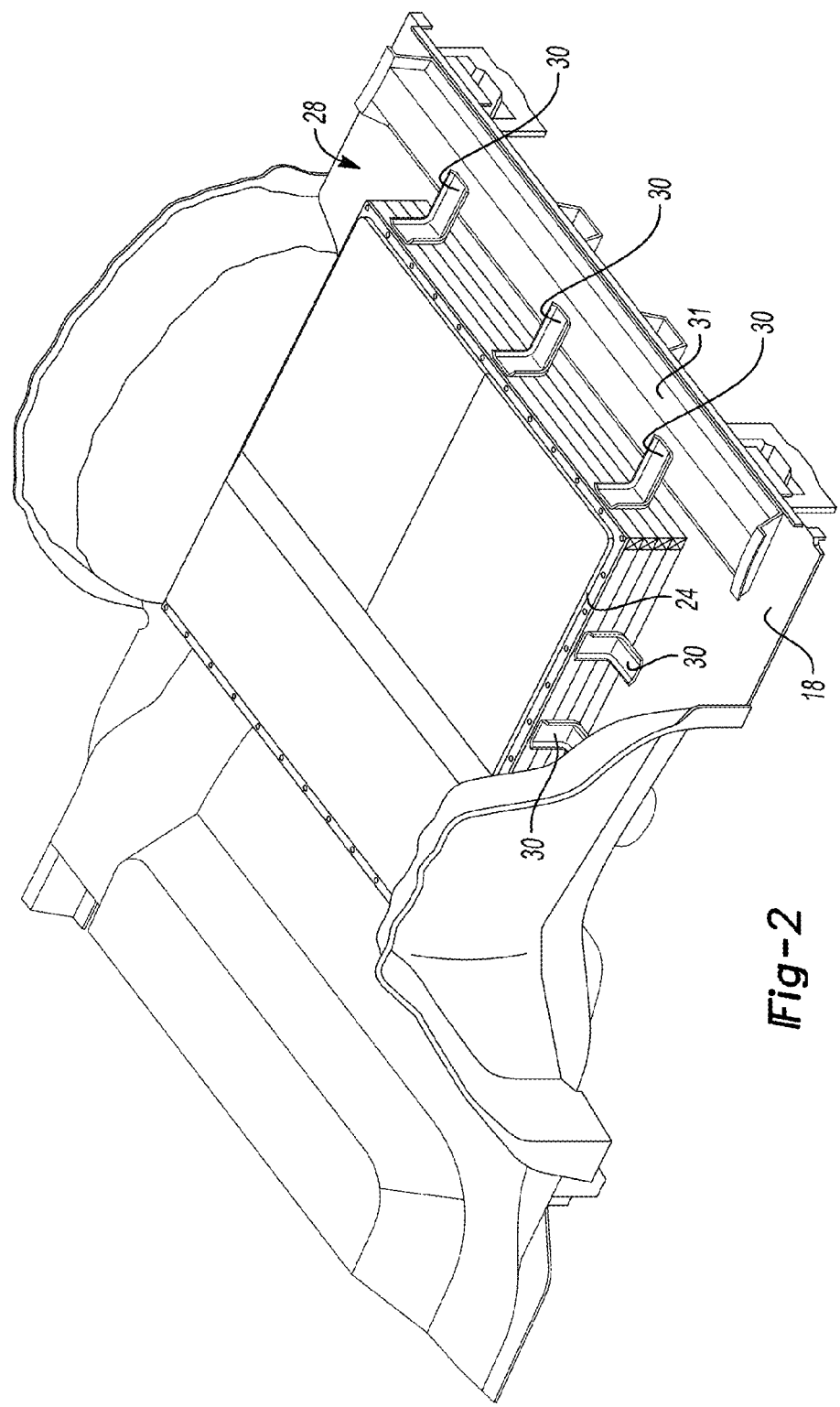
FIG. 2 is a perspective view of a prior art battery enclosure.

Referring to FIG. 2, a prior art battery enclosure 24 using steel attachment brackets 30 to attach the enclosure 24 to the tray structure 26 is depicted. The rearmost brackets 30 attach to the floor 18 using a rear support member 31. The rear support member 31 extends across the floor 18 and adds weight to the floor 18 of the vehicle 10. As discussed above, using individual brackets 30 may also create a point load on the traction battery 22.

Figure 3:
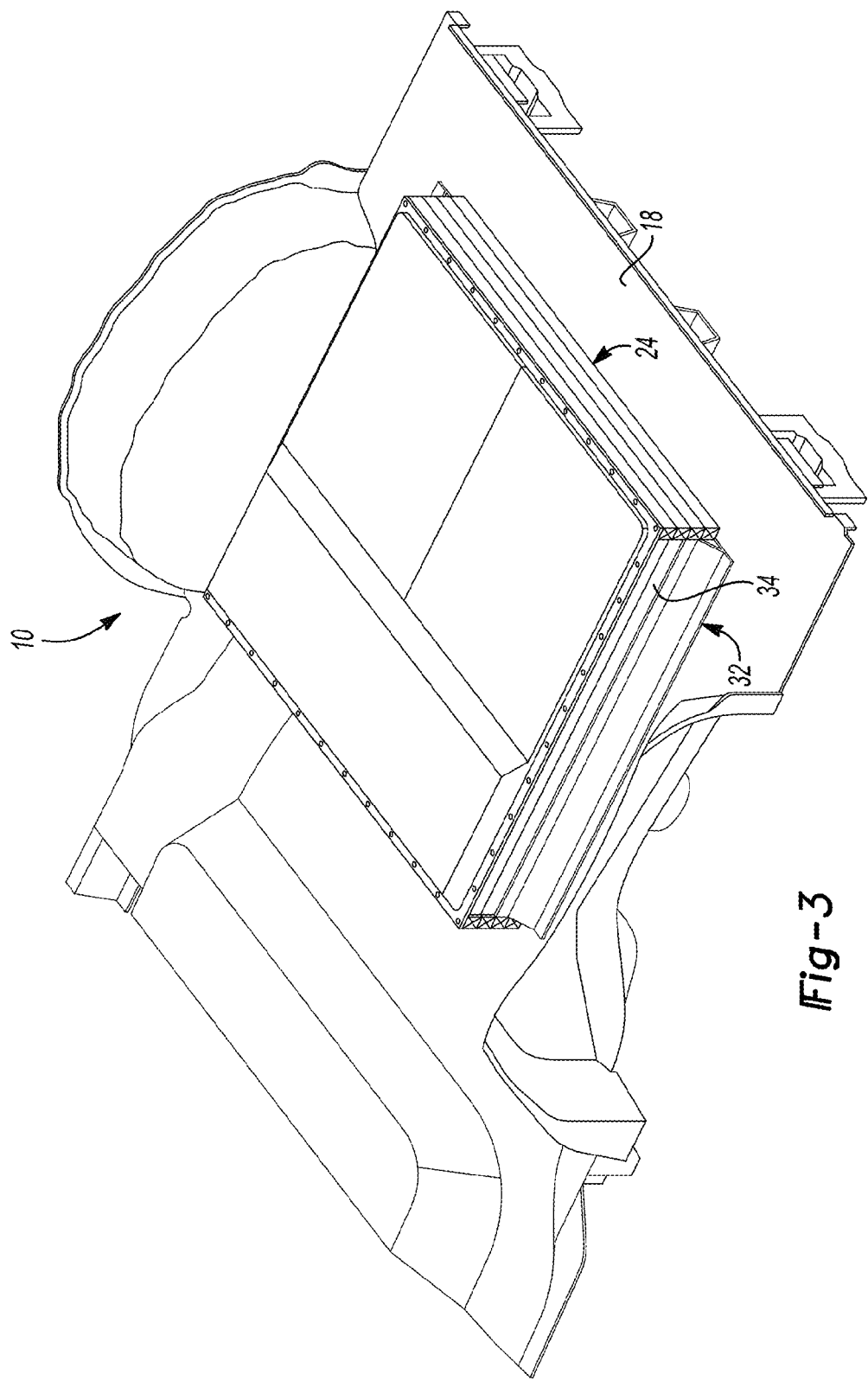
FIG. 3 is a perspective of a battery enclosure having an integrated attachment bracket.

FIG. 3 depicts a perspective view of a battery enclosure 24 using an attachment bracket 32 according to the present disclosure. Attachment bracket 32 eliminates the need for the steel brackets 30, as shown in FIG. 2. The attachment bracket 32 of the present disclosure is integral to the battery enclosure 24. More specifically, the attachment bracket 32 may be formed as part of a sidewall 34 of the battery enclosure 24. In some embodiments, at least two attachment brackets 32 may be formed of at least two sidewalls 34 of the battery enclosure 24 wherein the side walls 34 at least partially define a traction battery cavity. The sidewalls 34 may act as a frame for the fraction battery 22. As stated above, the battery enclosure 24 may be formed from extruded aluminum. Attachment bracket 32 may also be formed from extruded aluminum. Therefore, detachment bracket 32 may be formed while extruding the side wall 34 of the battery enclosure 24. Extruding the attachment bracket 32 as part of the sidewall 34 of the battery enclosure 24 allows the attachment bracket 32 in the battery enclosure 24 to be formed as a single piece.

Forming the attachment bracket 32 and the battery enclosure 24 as a single piece eliminates potential for galvanic reaction to occur between the attachment bracket 32 and the sidewall 34 of the battery enclosure 24. The attachment bracket 32 extends an entire length of the sidewall 34. This allows the attachment bracket 32 to distribute impact energy more uniformly across the sidewall 34 of the battery enclosure 24. This may allow the bracket 32 to maintain a position of the battery enclosure 24 relative to the floor 18. For example, during a rear impact at 55 mph having a 70% offset, the bracket 32 may eliminate movement of the battery enclosure 24 relative to the floor 18 such that the battery enclosure 24 does not intrude into the cabin. The attachment bracket 32 further aids to eliminate cabin intrusion of the battery enclosure 24 during a rear impact.

Using an attachment bracket 32 formed with the sidewall 34 of the battery enclosure 24 eliminates the need for the heavy steel attachment brackets 30 discussed above. Further, eliminating the majority of the steel attachment brackets 30 allows for the elimination of the rear support member 31, as shown in FIG. 2. By eliminating certain components and reducing weight of the vehicle 10, fuel economy and manufacturability may be improved through use of an attachment bracket 32 integral with the sidewall 34 of the battery enclosure 24. The attachment bracket 32 acts to increase structural durability of the vehicle 10 as well as reduces the overall weight of the vehicle 10. In one example, the attachment bracket 32 allows for elimination of seven steel brackets and the associated support member to achieve an approximate weight savings of 9 pounds.

Figure 4:
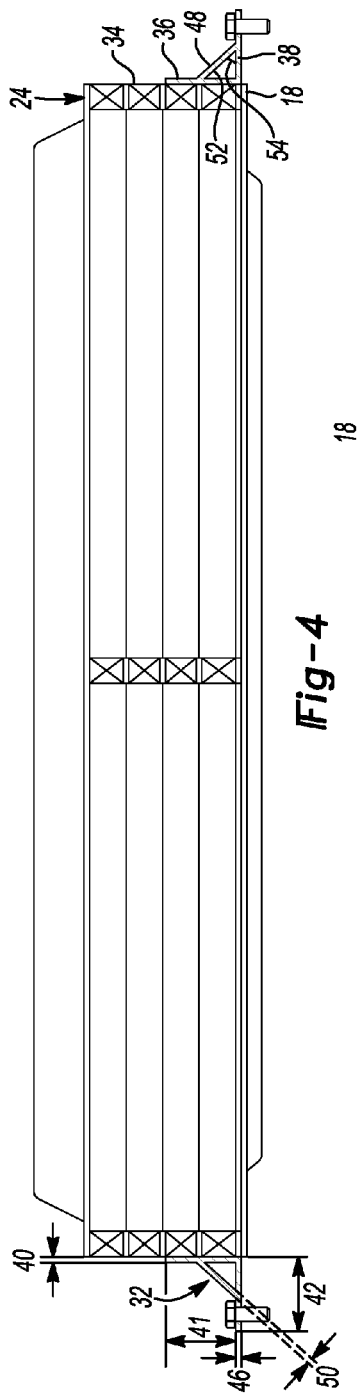
FIG. 4 is a rear view of a battery enclosure having an integrated attachment bracket.

Referring to FIG. 4, a rear view of the attachment bracket 32 and sidewall 34 of the battery enclosure 24 is depicted. The attachment bracket 32 may be L-shaped. The attachment bracket 32 includes a flange 36 and a foot 38. The foot extends perpendicularly from the sidewall 34 of the enclosure 24. The flange 36 extends perpendicularly from the foot 38 and is formed with the sidewall 34 of the battery enclosure 24. The flange 36 extends across the entire side wall 34. Extending across the entire side wall 34 allows the flange 36 to further aid in distributing impact energy uniformly across the sidewall 34 of the battery enclosure 24 and further eliminates point loads being imparted to the battery enclosure 24. The flange 36, formed as a part of the sidewall 34, may have a thickness 40 such that the flange 36 strengthens and adds rigidity and durability to the sidewall 34. For example the thickness 40 of the flange 36 may be approximately 3.5 mm. Likewise, the flange 36 may also have a height 41 such that the flange 36 further adds rigidity and durability to the battery enclosure 24. For example, the height 41 of the flange 36 may be approximately 2 inches.

The foot 38 secures the attachment bracket 32, and likewise the battery enclosure 24, to the floor 18. The foot 38, by example, may be secured to the floor 18 using bolts. In at least one other embodiment, the foot 38 may be welded, or adhered to the floor 18. The foot 38 extends the length of the sidewall 34. Extending the length of the sidewall 34 further aids the attachment bracket 32 in providing uniform distribution across the sidewall 34 of the battery enclosure 24. The foot 38 extends a length 42 such that the foot 38 secures the battery enclosure 24 to the floor 18 in order to maintain a position of the battery enclosure 24 relative to the floor 18 during a rear impact. For example, the length 42 of the foot 36 may be approximately 2 inches. Likewise, the foot 38 has a thickness 46 such that the aluminum bracket 32 is able to absorb energy from an impact and distribute the energy uniformly across the foot 36. For example, the thickness 46 of the foot may be approximately 5 mm. The uniform distribution across the foot 36 allows the attachment bracket 32 to absorb impact energy and prevent point loading onto the traction battery 22. Preventing point loading on the traction battery 22 further aids to prevent damage to the traction battery 22.

The attachment bracket 32 may also include a cross-member 48. The cross-member 48 extends from the foot 38 to the flange 36. As can be seen with reference to FIG. 4, the cross-member 48 also extends the length of the attachment bracket 32 and likewise the sidewall 34. The cross-member 48 may also include a thickness 50 such that the cross-member 48 further aids the attachment bracket 32 to absorb impact energy and distribute the impact energy uniformly across the sidewall 34 of the battery enclosure 24. For example, the cross-member 48 may have a thickness 50 of approximately 3.5 mm. The cross-member 48 may also be angled with respect to the flange 36 and the foot 38. For example, an angle 52 between the cross-member 48 and the flange 36 may be such that the attachment bracket 32 maximizes the stiffness and rigidity of the battery enclosure 24. An angle 54 between the cross-member 48 and the foot 38 may be optimized such that the strength of the attachment bracket 32 allows the battery enclosure 24 to maintain a constant position between the battery enclosure 24 and the floor 18 of the vehicle 10.

Figure 5:
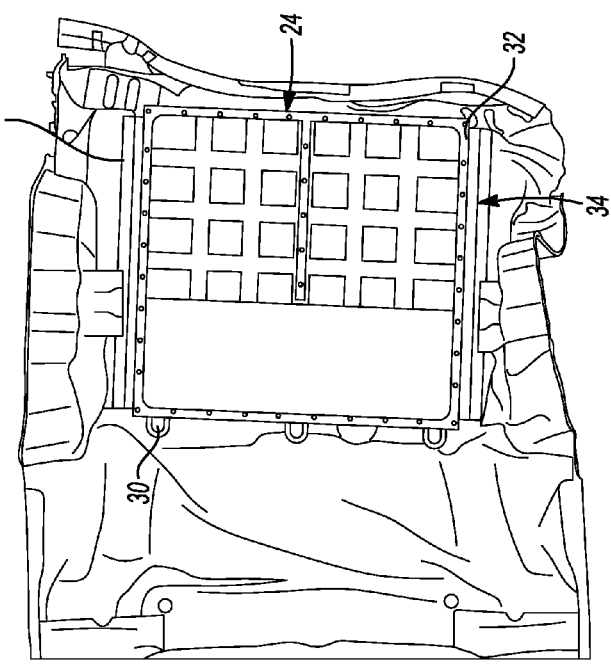
FIG. 5 is a top view of a battery enclosure having an integrated attachment bracket after an impact.

FIG. 5 depicts a top view of the battery enclosure 24 having an integrated attachment bracket 32 during an impact event. Specifically, FIG. 5 depicts the attachment bracket 32 maintaining integrity during a 55 mph 70% rear offset and DB impact. For example, the failure strain of the attachment bracket 32 may be at least 10%. The attachment bracket 32, therefore does not fail during a 55 mph 70% offset 301 MDB rear impact and allows the battery enclosure 24 to maintain a substantially constant relative position between the battery enclosure 24 and the floor 18. FIG. 5 depicts the attachment bracket 32 securing the battery enclosure 24 to the floor and reducing cabin intrusion, as described above, during impact. The attachment bracket 32 reduces intrusion from 209 mm to 94 mm.

The attachment bracket 32 reduces relative movement between the battery enclosure 24 and the floor 18 in a way such that 115 mm of intrusion is prevented. FIG. 5 further depicts the uniform distribution of the impact energy by the attachment bracket 32. For example, the attachment bracket 32 distributes the load from the rear impact along the length of the sidewall 34 of the battery enclosure 24 and eliminates point loading on the battery enclosure 24 by eliminating the prior art steel brackets 30 described above. While FIG. 5 depicts a 55 mph 70% rear offset and DB impact, the attachment bracket 32 may be used to increase integrity of the battery enclosure 24 during other impact events, such as a 50 mph side fuel filler barrier impact. The attachment bracket 32 increases uniform distribution of energy during a variety of impacts, and eliminates galvanic corrosion between two dissimilar metals.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a floor; and
    an aluminum battery enclosure integrally formed to have L-shaped side walls each at least partially defining a traction battery cavity and a foot attached to the floor perpendicular to the side walls, wherein each foot of each of the side walls extends an entire length of the corresponding side wall to distribute impact energy along the entire length to maintain a relative position between the floor and enclosure; and
    a cross-member extending from each of the feet to the corresponding side wall, wherein each of the cross-members extend across the entire length of the corresponding side wall.

2. The vehicle of claim 1, wherein the L-shaped side walls are aluminum extrusions.

3. The vehicle of claim 1, wherein each of the feet has a thickness in a range of 3.5 mm to 5 mm.

4. An enclosure for a battery of a hybrid electric vehicle comprising:
    a battery cell array;
    an aluminum frame having side walls surrounding the battery cell array; and
    an aluminum bracket including
        a flange integrally formed to the frame,
        a foot mated with a floor perpendicular to the flange of the vehicle and extending away from the one of the side walls, and
        a cross-member integrally formed with and extending between the flange and foot at an angle, wherein the flange, foot and cross-member extend across an entire length of each of the side walls.

5. The enclosure of claim 4, wherein the aluminum bracket is formed as part of the aluminum frame.

6. The enclosure of claim 4, wherein the aluminum bracket is L-shaped.

7. The enclosure of claim 4, wherein the flange is configured to distribute impact energy along the entire length of the one of the side walls.

8. The enclosure of claim 4, wherein the aluminum bracket further includes a ledge configured to maintain a position of the battery cell array.

9. A vehicle body in white structure comprising:
    a floor;
    an aluminum battery enclosure having a frame surrounding a battery array; and
    an aluminum bracket defining a flange integrally formed with the frame, a foot attached to the floor perpendicular to the flange and a cross-member integrally formed with and extending between the flange and the foot at angle, wherein the flange, foot and cross-member extend across an entire length of the frame.

10. The structure of claim 9, wherein the cross-member is formed as an aluminum extrusion with the flange and foot.

11. The structure of claim 9, wherein the foot has a thickness in a range of 3.5 mm to 5 mm.

12. The structure of claim 9, wherein the flange has a thickness in a range of 3.5 mm to 5 mm.

* * * * *